May 10, 1966     T. R. STOCKTON     3,250,150
REGENERATIVE DRIVE TRANSMISSION
Filed Dec. 30, 1963
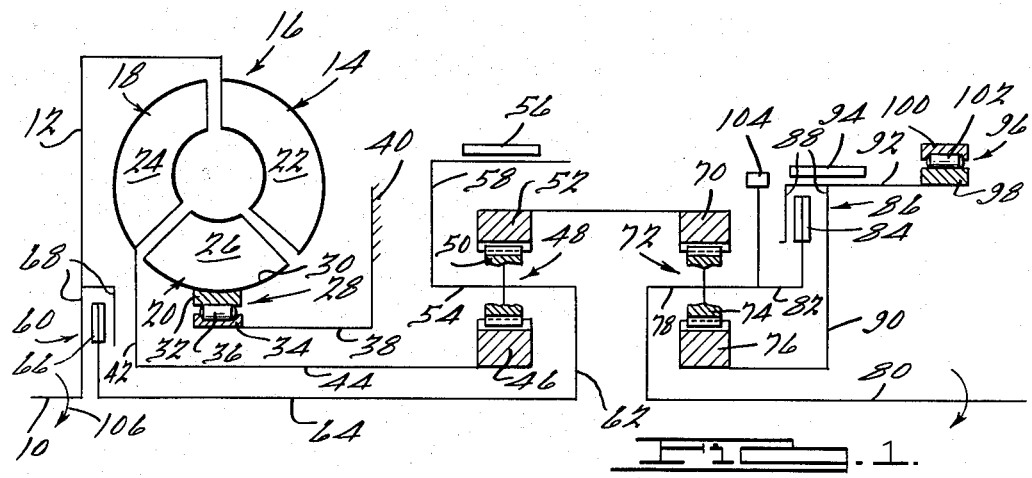
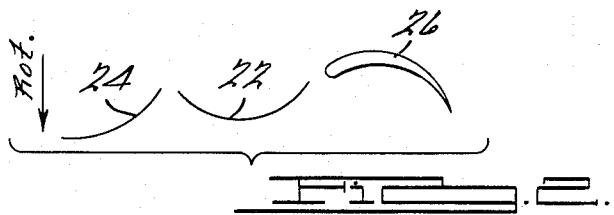
Thomas R. Stockton
INVENTOR.
BY John R. Faulkner
Robert E. McCollum
ATTORNEYS.

United States Patent Office 3,250,150
Patented May 10, 1966

3,250,150
REGENERATIVE DRIVE TRANSMISSION
Thomas R. Stockton, Northville, Mich., assignor to Ford Motor Company, Dearborn, Mich., a corporation of Delaware
Filed Dec. 30, 1963, Ser. No. 334,284
12 Claims. (Cl. 74—688)

This invention relates to an automatic transmission construction. More particularly, it relates to one having a hydrodynamic drive device combined with a number of planetary gearsets in a manner to provide a regenerative drive during forward operation to provide highly efficient operation of the transmission.

One of the objects of the invention is to provide an automatic transmission that is simple in construction, economical to operate, and yet provides a plurality of different drives through the transmission.

Another object of the invention is to provide an automatic transmission that has dual forward operating ranges. One is an economy drive range wherein normal vehicle start up is obtained by conditioning one gearset for a direct drive, with torque multiplication taking place through a hydrodynamic drive device and another gearset. The other range provides a performance drive, wherein normal vehicle start up is established with all of the torque transmitting units conditioned for a reduction drive, the units subsequently changing to provide a one-to-one fluid drive between the input and output shafts. Each of the forward drive ranges establishes a regenerative drive to increase the transmission operating efficiency.

A further object of the invention is to provide an automatic transmission construction having a regenerative drive during its forward speed operation, wherein the pump of a hydraulic torque converter is driven by a gearset to drive an input shaft driven turbine, and thereby supplement the input shaft torque to the gearset, a reverse drive being provided by the turbine driving the pump by a reversal in the direction of circulation of flow of operating fluid in the converter.

A further object of the invention is to provide a transmission of the type described above, wherein nonsynchronous, automatic pickup shifts are provided by means of overrunning couplings, thereby effecting smooth transitions between speed ratio changes.

Other objects, features, and advantages of the invention will become apparent upon reference to the succeeding detailed description thereof, and to the drawings illustrating the preferred embodiment thereof; wherein, FIGURE 1 shows, schematically, the upper half of a cross section of a transmission embodying the invention; and, FIGURE 2 shows an enlarged cross-sectional view through the blading of the torque converter shown in FIGURE 1.

FIGURE 1 shows a transmission having a power input shaft 10, which may be driven by any suitable source of power, such as, for example, the internal combustion engine for a motor vehicle. This shaft is drivingly connected by a shell or cover 12 to a turbine member 14 constituting one element of a hydraulic torque converter 16. The converter includes pump or impeller member 18 and a stator 20. Each of the turbine, pump and stator members comprises circumferentially spaced blades 22, 24, and 26, secured between inner and outer annular shrouds, as shown.

Converter 16 is of the type that is filled with operating fluid at all times. The pump, turbine and stator shrouds together define a toroidal path for the circulation of fluid in a known manner between the members to multiply torque at low speeds of rotation, while the unit acts essentially as a fluid coupling at higher speeds to transmit the input torque through it without torque multiplication.

The normal operation of a converter of this type is known, with the input shaft driving the pump 18 to drive turbine 14, the stator 20 multiplying the input shaft torque. In this particular case, the power input shaft 10 is connected to what is normally the turbine 14, instead of the pump 18; the pump, however, is still the driver during forward speed operation, as will be explained more clearly later. In brief, it is the driver because it is driven by the gearset faster than it is driven by the turbine. However, there are times, such as during a reverse drive, which will also be explained later, when the turbine 14 becomes the driving member, thereby reversing the normal direction of circulation of fluid in the toroidal circuit of the converter.

The torque multiplying phase of operation of the converter is provided by holding stator 20 against rotation in a direction opposite to that of the pump 18 at low converter speeds, while permitting its free rotation in the same direction as the pump at higher speeds. This is accomplished by means of a one-way overrunning brake 28. The inner shroud 30 of stator 20 is secured to the outer race 32 of brake 28. It is of a known mechanical type, having an inner race 34 separated from race 32 by a number of sprags or rollers 36. Inner race 34 is held stationary at all times by its being connected by a member 38 to a stationary portion 40 of the transmission housing. The brake operates in a known manner, the sprags wedging the two races together upon rotation of stator 20 in a direction opposite to that of pump 18; the sprags 36 moving to inoperative positions upon rotation of the stator in the same direction as the pump, thereby permitting the free forward or clockwise rotation of the stator.

Pump 18 is connected by a flange 42 to one end of a shaft 44. The opposite end of this shaft has secured to it the sun gear 46 of a first planetary gearset 48. This gearset is of the simple three-element type, having planet pinion gears 50 (only one shown) meshing with the sun gear and a ring gear 52. The pinion gears are rotatably mounted upon a carrier 54, which is adapted to be controlled in two ways. It can be held against rotation by a reverse brake band 56 engaging a drum-like carrier extension 58. The band is of a known fluid pressure actuated, spring-released type. Alternately, carrier 54 can be driven by a direct connection to input shaft 10 and turbine 14 through a clutch 60. More specifically, carrier 54 is connected by a flange 62 to one end of a shaft 64. The opposite end of the shaft is secured to a friction disc 66 constituting the driven portion of clutch 60. The clutch is of a known fluid pressure actuated, spring-released type, and has a number of driving friction discs 68 secured to the driving shell 12. As will be seen more clearly later, it is the engagement of clutch 60 that provides a regenerative drive through the transmission.

Ring gear 52 is fixed to a ring gear 70 of a second planetary gearset 72. This gearset is also of the simple three-element type, and has planet pinion gears 74 meshing with ring gear 70 and a sun gear 76. The pinion gears are rotatably mounted on an annular carrier 78 fixedly secured for rotation with a power output shaft 80.

The carrier has an axial extension 82 that is secured to the friction disc 84 of a clutch 86. This clutch, like clutch 60, is of the fluid pressure actuated, spring-released type, and has a number of friction discs 88 cooperating with the disc 84. The discs 88 are connected by a flange 90 to sun gear 76. The discs also have an axial extension 92 adapted to be held against rotation in either direction by a brake band 94, or, against rotation in one direction only by an overruning brake 96.

Band 94 is similar to band 56, being applied by fluid under pressure and released by spring means, not shown. One-way brake 96 is similar to brake 28, preventing reverse or counterclockwise rotation of sun gear 76, while permitting it to rotate freely in the opposite direction. The brake comprises inner and outer annular races 98 and 100 separated by spaced sprags or rollers 102.

Before proceeding to a description of the overall operation, it is believed that the invention will be clearer with an illustrative example as to the torque distribution through the system. This particular embodiment of the invention is adapted to provide a forward drive normally by starting up the vehicle with the second gearset 72 conditioned for a direct drive. This requires, therefore, that the torque requirements for vehicle start up must be satisfied by the first gearset 48 and the multiplication of torque through the converter 16. It is the regenerative drive between torque converter 16 and gearset 48 that enables the normal start up to be an efficient one, and one with sufficient torque capacity.

Assume that the gearset stall ratio is 2.88 and clutch 60 is engaged. Because of the carrier drive of the gear unit, sun gear 46 will have a torque ratio of, say, 1.15; which means that the pump 18 will have a torque imparted to it that will cause it to be driven faster in a forward or clockwise direction by the sun gear than it is being driven by the turbine 14 from input shaft 12. This torque establishes the pump as the driving member during forward drive ranges to provide a clockwise circulation of flow through the converter to multiply torque in a known manner. With a converter having, say, a 2.53 torque ratio at stall of the gearset, the converter torque, multiplied back to the input shaft 10 via turbine 14 will, therefore, be at a ratio of, say, 3.03, which, when combined with the initial unitary or 1.0 torque ratio of input shaft 10, at clutch 60, provides a 4.03 torque ratio at carrier 54.

Thus, it will be seen that a regenerative drive is provided by the particular arrangements and torque capacities provided. During reverse operation, when clutch 60 is disengaged, no regenerative drive exists, and turbine 14 then becomes the pump or impeller member to circulate the converter fluid in a counterclockwise direction and drive pump 18.

In operation, therefore, Neutral or No Drive condition is established by disengaging clutches 60 and 86 and brakes 56 and 94. Since carrier 54 is free to rotate, no reaction is provided for the gearset; consequently, no drive is transmitted through the gearsets. If desired, a parking pawl, not shown, may engage a toothed extension 104 of carrier 78 to positively brake the rotation of power output shaft 80.

The normal vehicle start up forward driving range is established by engaging clutches 60 and 86. Clutch 86 connects sun gear 76 and carrier 78, thereby locking up gearset 72 for a direct drive through it. Clockwise rotation of input shaft 10 in the direction of arrow 106 rotates shaft 64 and carrier 54 in the same direction. With load shaft 80 initially resisting movement of ring gear 52, pinions 50 are caused to walk around within the ring gear in a counterclockwise direction to impart torque both to sun gear 46 and ring gear 52 in a clockwise or forward direction. The torque imparted by the sun gear 46 is transmitted to pump 18 causing it to become the driving member of the converter. It, therefore, drives the turbine clockwise faster than it is being driven by shell 12, the stator 20 initially being held against reverse rotation by one-way brake 28. The torque multiplied by the converter, therefore, is returned through shell 12 and clutch 60 to carrier 54 to drive ring gear 52 in a clockwise or forward direction. Output shaft 80 is, therefore, driven in the same direction, and at a speed reduced from that of input shaft 10.

For a performance starting range, gearset 72 can be conditioned for a reduction forward drive by disengaging clutch 86 and permitting one-way brake 96 to operate. If desired, to prevent vehicle coasting, or to provide hill braking, the brake 94 can be engaged to prevent rotation of sun gear 76 in either direction. The start up drive in this instance will be the same as described in connection with the normal start up range, as far as converter 16 and gearset 48 are concerned. The clockwise rotation of ring gear 52, therefore, rotates ring gear 70 to attempt to rotate the pinion gears 74 in a counterclockwise direction about initially stationary output shaft 80. This attempts to rotate sun gear 76 rearwardly, which is prevented by the one-way brake 96, or brake 94, if engaged. The carrier 78 is, therefore, caused to walk around the stationary sun gear in a clockwise direction to drive output shaft 80 at a speed reduced from that of ring gear 70. The performance drive range, therefore, provides a compound reduction through both gearsets instead of just through gearset 48.

A Reverse drive is established by disengaging clutches 60 and 86, and engaging brake bands 94 and 56. Clockwise rotation of input shaft 10 drives turbine 14 in the same direction. With clutch 60 disengaged, turbine 14, therefore, is the sole input to the converter, and becomes the driving member to circulate the converter operating fluid in a counterclockwise direction and drive member 18 in the same direction as shaft 10; that is, the fluid leaving the turbine blades, as seen in FIGURE 2, strikes the blades 24 in a manner to drive them in the same direction as member 14 as indicated by the arrow. Accordingly, sun gear 46 is driven clockwise, rotating pinion gears 50 in a counterclockwise direction about stationary carrier 54, to rotate ring gears 52 and 70 counterclockwise. With sun gear 76 being held against rotation in either direction, carrier 78 and output shaft 80 are driven in a reverse or counterclockwise direction, and at a reduction in speed from that of input shaft 10.

While the invention has been illustrated in its preferred embodiment, it will be clear to those skilled in the arts to which the invention pertains that many changes and modifications may be made thereto without departing from the scope of the invention.

I claim:

1. A transmission having power input and output shafts, and means connecting said shafts providing a regenerative drive therebetween, said means including a torque multiplying hydrodynamic device having a pump and turbine and stator, and a planetary gearset having a plurality of rotatable members including sun and ring gears and a planet carrier, means connecting said turbine to said input shaft, means connecting said pump to said sun gear, means connecting said ring gear to said output shaft, releasable brake means for holding said carrier stationary to provide one drive through said transmission, and engageable means to connect said input shaft and said carrier, rotation of said input shaft upon engagement of said engageable means and release of said brake means providing a regenerative drive to said gearset by the drive of said turbine and said input shaft by said pump.

2. A transmission having power input and output shafts, and means connecting said shafts providing a regenerative drive therebetween, said means including a hydrodynamic drive device having rotatable elements including a pump and turbine, and first and second planetary gearsets each having a plurality of rotatable members, means connecting said turbine and one of said first gearset members to said input shaft, means connecting said pump to a second of said first gearset members, and means connecting a third of said first gearset members to a member of said second gearset, means connecting a further member of said second gearset to said output shaft, releasable brake means for conditioning said second gearset for a reduction drive therethrough, and engageable clutch means for conditioning said second gearset to provide a direct drive through the second gearset, rotation of said input shaft providing a regenerative drive to said first gearset by the drive of said turbine by said pump, the alternate engagement and release of said brake and clutch means providing two reduction drives through said transmission upon initial rotation of said input shaft.

3. A transmission having power input and output shafts, and means connecting said shafts providing a number of drives therebetween, said means including a hydrodynamic drive device having rotatable elements including a pump and turbine, and first and second planetary gearsets each having a plurality of rotatable members, means connecting said turbine to said input shaft, means connecting said pump to a first of said first gearset members, means connecting a second of said first gearset members to a member of said second gearset, means connecting a further member of said second gearset to said output shaft, first and second releaseable brake means for holding a third member of said first gearset and another member of said second gearset stationary to condition each of said gearsets for a reduction drive, engageable clutch means connecting two of the members of said second gearset to provide a direct drive through the gearset, engagement of said brake means and release of said clutch means upon rotation of said input shaft providing one drive through said transmission by the drive of said pump by said turbine, the engagement of said clutch means and release of said second brake means providing another drive through said transmission, and selectively operable clutch means connecting said first gearset third member to said input shaft and turbine to provide a regenerative drive of said first gearset by the drive of said turbine by said pump upon release of said first brake means and engagement of said latter clutch means while the transmission is conditioned for either of the one or another of the drives.

4. A transmission having power input and output shafts, and means connecting said shafts providing a number of drives therebetween, said means including a hydraulic torque converter having a pump and turbine and stator, and first and second planetary gearsets each having a sun gear and a ring gear and a planet carrier, means connecting said turbine to said input shaft, first selectively operable clutch means connecting said input shaft to said first gearset carrier, means connecting said pump to one gear of said first gearset, means connecting the other gear of said first gearset to one of the gears of said second gearset, means connecting said second gearset carrier to said output shaft, first and second releaseable brake means for holding the first gearset carrier and the second gearset other gear stationary to condition each of said gearsets for a reduction drive, second selectively operable clutch means connecting portions of the second gearset together to provide a direct drive through the second gearset, engagement of said first and second clutch means and release of said brake means providing a normal start up drive of said transmission, rotation of said input shaft while said transmission is conditioned for a normal start up drive providing a regenerative drive to said first gearset by the drive of said turbine and input shaft and carrier by said pump, the respective engagement and release of said second brake and second clutch means providing a performance regenerative drive through said transmission upon initial rotation of said input shaft.

5. A transmission having power input and output shafts, and means connecting said shafts providing a regenerative drive therebetween, said means including a hyrodynamic drive device having rotatable elements, and a planetary gearset having a plurality of rotatable members, means connecting one of said elements to said input shaft, selectively engageable means connecting said input shaft to one of said members, means connecting a second of said elements to a second of said members, means connecting a third of said members to said output shaft, rotation of said input shaft in one direction upon engagement of said selectively engageable means providing a regenerative drive to said gearset by said connections of said drive device elements to said members effecting a drive of said second element faster by said gearset second member than said second element is driven by said first element and input shaft thereby applying additional torque to said first element and input shaft by said second element whereby said third member is driven in said one direction, and second selectively engageable means to hold said first member stationary, rotation of said input shaft in said one direction upon engagement of said second engageable means and disengagement of said first engageable means effecting driving of said second element and second member in said one direction by said first element and input shaft to drive said third member in the opposite direction.

6. A transmission having power input and output shafts, and means connecting said shafts providing a regenerative drive therebetween, said means including a hydrodynamic drive device having pump and turbine elements, and a planetary gearset having a plurality of rotatable members, means connecting said turbine element to said input shaft, selectively engageable means connecting said input shaft to one of said members, means connecting said pump element to a second of said members, means connecting a third of said members to said output shaft, rotation of said input shaft in one direction upon engagement of said selectively engageable means providing a regenerative drive to said gearset by said connections of said torque multiplying means elements to said members effecting a drive of said pump element faster by said gearset second member than said pump element is driven by said turbine element and input shaft thereby applying additional torque to said turbine element and input shaft by said pump element whereby said third member is driven in said one direction, and second selectively engageable means to hold said first member stationary, rotation of said input shaft in said one direction upon engagement of said second engageable means and disengagement of said first engageable means effecting driving of said pump element and second member in said one direction by said turbine element and input shaft to drive said third member in the opposite direction.

7. A transmission having power input and output shafts, and means connecting said shafts providing a regenerative drive therebetween, said means including a hydraulic torque multiplying means having pump and turbine and reaction elements, and a planetary gearset having a plurality of rotatable members, means connceting said turbine element to said input shaft, selectively engageable means connecting said input shaft to one of said members, means connecting said pump element to a second of said members, means connecting a third of said members to said output shaft, rotation of said input shaft in one direction upon engagement of said selectively engageable means providing a regenerative drive to said gearset by said connections of said torque multiplying means elements to said members effecting a drive of said pump element faster by said gearset second member than said pump element is driven by said turbine element and input shaft thereby applying additional torque to said turbine element and input shaft by said pump element whereby said third member is driven in said one direction, and second selectively engageable means to hold said first member stationary, rotation of said input shaft in said one direction upon engagement of said second engageable means and disengagement of said first engageable means effecting driving of said pump element and second member in said one direction by said turbine element and input shaft to drive said third member in the opposite direction.

8. A transmission having power input and output shafts, and means connecting said shafts providing a regenerative drive therebetween, said means including a hydrodynamic drive device having pump and turbine elements, and a planetary gearset having a plurality of rotatable members including sun and ring gears and a planet carrier, means connecting said turbine to said input shaft, selectively engageable means connecting said input shaft to said carrier, means connecting said pump element to said sun gear, means connecting said ring gear to said output shaft, rotation of said input shaft in one direction upon engagement of said selectively engageable means providing a regenerative drive to said gearset carrier by said connections of said torque multiplying means elements to said members effecting a drive of said pump element faster by said sun gear than said pump element is driven by said turbine element and input shaft thereby applying additional torque to said turbine element and input shaft by said pump element whereby said ring gear is driven in said one direction, and second selectively engageable means to hold said carrier stationary, rotation of said input shaft in said one direction upon engagement of said engageable means and disengagement of said first engageable means effecting driving of said pump element and sun gear in said one direction by said turbine element and input shaft to drive said ring gear in the opposite direction.

9. A transmission having power input and output shafts, and means connecting said shafts providing a regenerative drive therebetween, said means including a hydraulic torque multiplying means having pump and turbine and reaction elements, and a planetary gearset having a plurality of rotatable members including sun and ring gears and a planet carrier, means connecting said turbine to said input shaft, selectively engageable means connecting said input shaft to said carrier, means connecting said pump element to said sun gear, means connecting said ring gear to said output shaft, rotation of said input shaft in one direction upon engagement of said selectively engageable means providing a regenerative drive to said gearset carrier by said connections of said torque multiplying means elements to said members effecting a drive of said pump element faster by said sun gear than said pump element is driven by said turbine element and input shaft thereby applying additional torque to said turbine element and input shaft by said pump element whereby said ring gear is driven in said one direction, and second selectively engageable means to hold said carrier stationary, rotation of said input shaft in said one direction upon engagement of said second engageable means and disengagement of said first engageable means effecting driving of said pump element and sun gear in said one direction by said turbine element and input shaft to drive said ring gear in the opposite direction.

10. A transmission having power input and output shafts, and means connecting said shafts providing a regenerative drive therebetween, said means including a hydrodynamic drive device having rotatable elements, and a plurality of planetary gearsets each having a plurality of rotatable members, means connecting one of said elements to said input shaft, first selectively engageable clutch means connecting said input shaft to one of said members of one gearset, means connecting a second of said elements to a second of said members of said one gearset, means connecting a third of said members of said one gearset to a member of another of said gearsets, means connecting a further member of said other gearset to said output shaft, releaseable brake means holding one of the members of said another gearset stationary to condition said gearsets for one drive therethrough, and second selectively engageable clutch means connecting two of the members of said another gearset to provide a direct drive through the other gearset, rotation of said input shaft in one direction upon engagement of said first clutch means and said brake means and disengagement of said second clutch means providing a regenerative drive to said one gearset by said connections of said drive device elements to said members effecting a drive of said second element faster by said one gearset second member than said second element is driven by said first element and input shaft thereby applying additional torque to said first element and input shaft by said second element whereby said one gearset third member is driven in said one direction, the subsequent engagement of said second clutch means and release of said brake means providing a different drive through said transmission.

11. A transmission having power input and output shafts, and means connecting said shafts providing a regenerative drive therebetween, said means including a hydrodynamic drive device having rotatable elements, and a plurality of planetary gearsets each having a plurality of rotatable members, means connecting one of said elements to said input shaft, first selectively engageable clutch means connecting said input shaft to one of said members of one gearset, means connecting a second of said elements to a second of said members of said one gearset, means connecting a third of said members of said one gearset to a member of another of said gearsets, means connecting a further member of said other gearset to said output shaft, releasable brake means holding one of the members of said another gearset stationary to condition said gearsets for one drive therethrough, and second selectively engageable clutch means connecting two of the members of said another gearset to provide a direct drive through the other gearset, rotation of said input shaft in one direction upon engagement of said first clutch means and said brake means and disengagement of said second clutch means providing a regenerative drive to said one gearset by said connections of said drive device elements to said members effecting a drive of said second element faster by said one gearset second member than said second element is driven by said first element and input shaft thereby applying additional torque to said first element and input shaft by said second element whereby said one gearset third member is driven in said one direction, the subsequent engagement of said second clutch means and release of said brake means providing a different drive through said transmission, and selectively engageable brake means to hold said one gearset one member stationary, rotation of said input shaft in said one direction upon engagement of said engageable brake means and disengagement of said first clutch means effecting driving of said second element and one gearset second member in said one direction by said first element and input shaft to drive said one gearset third member in the opposite direction.

12. A transmission having power input and output shafts, and means connecting said shafts providing a regenerative drive therebetween, said means including a hydraulic torque multiplying device having a pump and turbine and reaction elements, and a plurality of planetary gearsets each having a plurality of rotatable members including sun and ring gears and a planet carrier, means connecting said turbine element to said input shaft, first selectively engageable clutch means connecting said input shaft to the carrier of one of said gearsets, means connecting said pump element to the sun gear of said one gearset, means connecting the ring gear of said one gearset to a member of another of said gearsets, means connecting a further member of said other gearset to said output shaft, releaseable brake means holding one of the members of said another gearset stationary to condition said gearsets for one drive therethrough, and second selectively engageable clutch means connecting two of the members of said another gearset to provide a direct drive through the other gearset, rotation of said input shaft in one direction upon engagement of said first clutch means and said brake means and disengagement of said second clutch means providing a regenerative drive to said one gearset by said connections of said drive device elements to said members effecting a drive of said pump element faster by said one gearset sun gear than said pump element is driven by said turbine element and input shaft thereby applying additional torque to said turbine element and input shaft by said pump element whereby said one gearset ring gear is driven in said one direction, the subsequent engagement of said second clutch means and release of said brake means providing a different drive through said transmission, and selectively engageable brake means to hold said one gearset carrier stationary, rotation of said input shaft in said one direction upon engagement of said engageable brake means and disengagement of said first clutch means effecting driving of said pump element and one gearset sun gear in said one direction by said turbine element and input shaft to drive said one gearset ring gear in the opposite direction.

References Cited by the Examiner

UNITED STATES PATENTS

| | | | |
|---|---|---|---|
| 2,283,759 | 5/1942 | Pollard | 74—688 |
| 2,292,482 | 8/1942 | Roche | 74—688 |
| 2,334,394 | 11/1943 | Dodge | 74—688 |
| 2,353,905 | 7/1944 | Kelley | 74—688 |
| 2,762,237 | 9/1956 | Kelbel | 74—688 |
| 2,970,497 | 2/1961 | Foerster | 74—688 |
| 3,086,541 | 4/1963 | DeCorte | 74—688 |

DAVID J. WILLIAMOWSKY, *Primary Examiner.*

T. C. PERRY, *Assistant Examiner.*